July 9, 1963 L. F. DICKESON ET AL 3,096,667
TRANSMISSION SYSTEM AND HYDRAULIC CONTROLS THEREFOR
Filed Aug. 15, 1960 11 Sheets-Sheet 1

INVENTORS
LEONARD F. DICKESON
VERGIL P. HENDRICKSON
GORDON W. JOHNSON
LEROY LICHTENSTEIN
SHAIRYL I. PEARCE
GERALD D. ROHWEDER
BY
ATTORNEYS

July 9, 1963  L. F. DICKESON ETAL  3,096,667
TRANSMISSION SYSTEM AND HYDRAULIC CONTROLS THEREFOR
Filed Aug. 15, 1960  11 Sheets-Sheet 10

INVENTORS
LEONARD F. DICKESON
VERGIL P. HENDRICKSON
GORDON W. JOHNSON
LEROY LICHTENSTEIN
SHAIRYL I. PEARCE
BY GERALD D. ROHWEDER

*Fryer and Finnvold*

ATTORNEYS

United States Patent Office 3,096,667
Patented July 9, 1963

3,096,667
TRANSMISSION SYSTEM AND HYDRAULIC CONTROLS THEREFOR
Leonard F. Dickeson, Wichita, Kans., and Vergil P. Hendrickson, Decatur, Gordon W. Johnson, Peoria, Le Roy Lichtenstein, Morton, Shairyl I. Pearce, Marquette Heights, and Gerald D. Rohweder, Peoria, Ill., assignors to Caterpillar Tractor Co., Peoria, Ill., a corporation of California
Filed Aug. 15, 1960, Ser. No. 49,587
20 Claims. (Cl. 74—731)

This invention relates to transmission systems and hydraulic controls therefor. More particularly, it relates to a pair of transmissions connected mechanically in tandem selectively to deliver a plurality of speed and power ratios and controlled by an integrated hydraulic system.

It is a primary object of this invention to provide a transmission system which is simple in operation but which is capable of delivering a plurality of speed ratios in both forward and reverse operation.

It is a further object of this invention to provide a transmission system comprising two transissions mechanically connected in tandem, one of the transmissions being shiftable into any one of a plurality of speed ratios responsive to manipulation of simplified controls, with the other transmission modifying each speed ratio delivered by the first transmission in accordance with varying conditions of speed and load.

Other objects and advantages of this invention will become apparent from the specification following when read in conjunction with the drawings attached wherein:

FIGS. 6, 7 and 8 are schematic illustrations of another portion of the hydraulic system showing in cross section the valves for controlling the rear transmission in various conditions of operation thereof;

Figure 1:
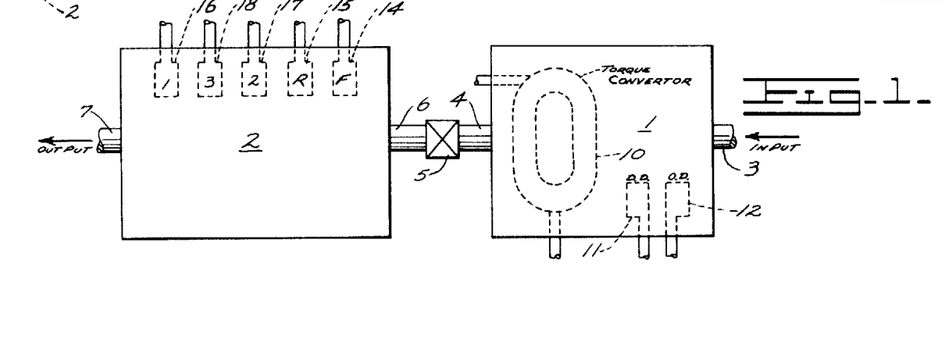
FIG. 1 is a schematic illustration showing the tandem mechanical arrangement of the transmission.

Referring now to the drawings and particularly to FIG. 1, there is shown a pair of transmissions 1 and 2 mechanically connected in tandem. Preferably, the forward transmission or front box is mounted to the rear of the engine fly wheel housing and the input or driving shaft 3 directly connected thereto. The front box output or driven shaft 4 is coupled by any suitable means shown generally at 5 to the input shaft 6 of the rear transmission, the output of which is delivered at shaft 7. The forward transmission 1 includes a hydraulic torque converter 10 and a suitable planetary transmission to be hereinafter described for direct drive and overdrive depending upon the selective engagement of a suitable hydraulic clutch or brake means shown generally at 11 and 12 respectively. The rear transmission is preferably of the planetary gear type capable of delivering a plurality of speed ratios dependent upon the actuation of suitable hydraulic clutches.

The direction of a the torque delivered at output shaft 7 is determined by hydraulic clutch means shown generally at 14 for forward and 15 for reverse, and in each direction power may be delivered in multiple speed ratios. Here, three speed ranges, low, second and high are shown, each selectively activated upon engagement of the appropriate hydraulic clutches 16, 17 and 18.

Figure 2:
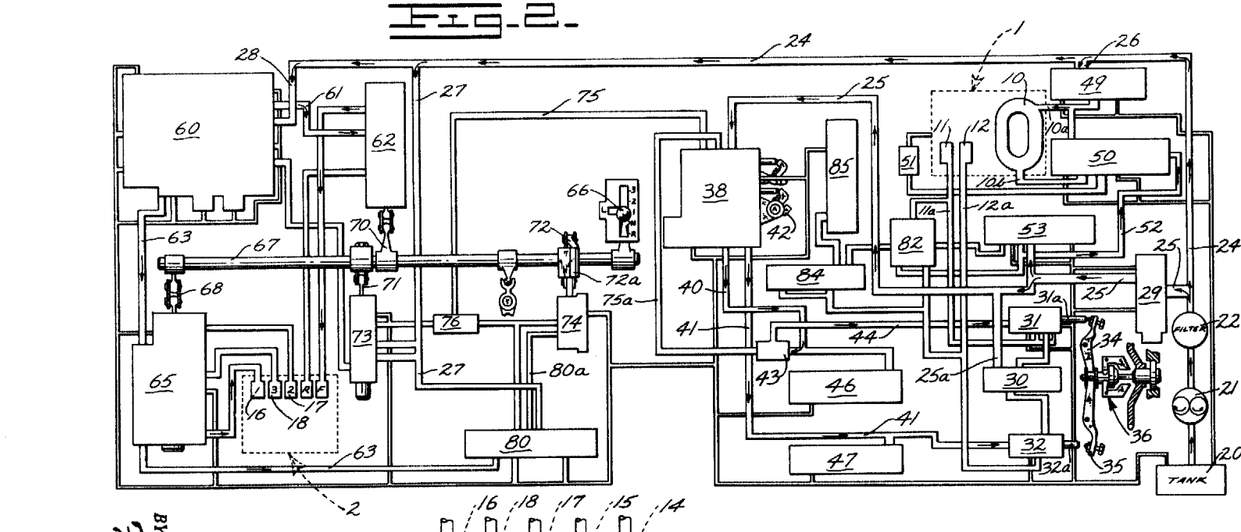
FIG. 2 is a schematic diagram showing the transmissions and the integrated hydraulic system therefor.

Referring now to FIG. 2, the hydraulic system which integrates the front and rear transmission hydraulically as well as mechanically is shown schematically. Hydraulic fluid is supplied to the system from a tank 20 by means of a pump 21 drawing the fluid through a filter 22 in the main supply conduit 24. From the main supply conduit 24, a number of branch lines direct the hydraulic fluid to the various components of the system. Following the direction of flow along main supply conduit 24, branch line 25 supplies the hydraulic controls of the forward transmission 1; a branch line 26 supplies the torque converter 10; branch line 27 supplies an upshift compensating system hereinafter to be explained; and branch line 28 supplies the hydraulic components of the rear transmission 2.

Hydraulic fluid in the forward transmission branch line 25 passes first through a pressure reducing valve 29 and then through a branch line 25a to the control system for the direct drive and overdrive hydraulic clutches 11 and 12.

In this control system the fluid flows first through a flow control valve 30 which directs it in proper volume to an open one of the normally closed direct and overdrive shift valves 31 and 32, respectively. Adapted to open the valves 31 and 32 successively as output speed is increased for successive engagement of the direct drive clutch 11 and overdrive brake 12 are the arms 34 and 35 of a speed governor 36. The lengths of the arms 34 and 35 and the projections 31a and 32a of the valve spools are adjusted so that the direct clutch shift valve 31 is engaged and opened after a first predetermined speed is reached. Then as speed is further increased the direct drive shift valve 31 is closed by further movement of the arm 34 and the overdrive shift valve is opened by the arm 35.

In the meantime, the front transmission hydraulic fluid is flowing along inlet branch line 25 to a throttle pressure regulator valve 38 which reduces the pressure of the fluid and delivers it in lines 40 and 41 at pressures proportionate to the movement of the engine throttle linkage 42. The fluid in line 40 flow through a check valve 43 to a line 44 where it is introduced into direct drive shift valve 31 to oppose the operation of the governor speed control 36. Similarly the pressure of the fluid in line 41 opposes the governor arm 35 in its effort to open overdrive shift valve 32. Thus, the operation of the shift valves 31 and 32 is dependent upon a proper balance of speed and load measured by throttle operation. Low pressure accumulators 46 and 47 maintain a full volume of oil in the systems of the control valves 31 and 32, respectively so that a consistent pressure is maintained to insure fast action of the valve spools.

Pressure in main conduit 24 is controlled by a relief valve 49 which bypasses fluid into the torque converter 10 by way of a conduit 10a. Associated with the torque converter 10 and in communication therewith is a torque converter charging valve 50 which maintains a predetermined pressure in the converter. Fluid bypassed through the converter charging valve 50 from torque converter outlet duct 10b is directed through a cooler 51 to provide lubrication for the transmission. The charging valve is actuated to pressurize the torque converter by the pressure of fluid flowing thereto through conduit 52 from a control valve 53. As will hereinafter be explained, the control valve 53 is opened to permit flow of pressure fluid to the charging valve only when the direct drive clutch 11 and overdrive brake 12 are not engaged.

The same hydraulic system that controls the operation of the forward transmission also controls the components of the rear transmission and unifies the operation of both transmissions. Fluid from the main conduit 24 enters the rear box system through branch line 28 to a pressure control valve group 60. From the valve group 60 the fluid flows through line 61 to a directional control valve 62, and through line 63 to a speed selection valve 65.

The rear transmission may be of more or less conventional planetary gear type with a plurality of power paths selectable to deliver desirable speed and power ratios in response to appropriate clutch engagement. The low, second and high speed clutches 16, 17 and 18 are of a suitable hydraulic type which are engaged when fluid flows thereto under the control of speed selector valve 65.

Speed selector valve 65 is conditioned to direct hydraulic fluid selectively to clutches 16, 17 and 18 in response to pivotal movement of a shift lever 66 splined onto a shaft 67 to which is also splined the selector valve control linkage 68. Also connected to the control shaft 67 for operation thereby are suitable linkages 70, 71 and 72 for the directional control valve 62, a safety reset and torque converter hold valve 73 and an over-ride selector valve 74.

The torque converter hold valve 73 is adapted to lock the forward transmission 1 in torque converter drive when the rear transmission is in neutral position by opening the branch line 27 through a check valve 76 to an over-ride pressure line 75, 75a in direct communication with the check valve 43 and hence shift valve control line 44. The main conduit pressure thus introduced into the direct shift valve 31 is sufficient to overcome any force of the governor control arm 34, keeping the direct drive clutch 11 inactive to hold the front transmission in torque converter drive while the rear box is in neutral position.

The over-ride selector valve 74 is a two position valve that is opened throughout the entire range of upshift movement of the shift lever 66 and closed during downshift, a slip clutch 72a being interposed for this purpose. During upshift, when the valve 65 opens the conduit to one of the speed clutches 16, 17 and 18 to fill it, pressure in the line 63 is thereby reduced and an over-ride control valve 80 normally closed by fluid pressure is opened to direct fluid through the open over-ride selector valve 74 and a check valve 76 into the over-ride pressure line 75, 75a. Thus, the front box 1 is returned to torque converter drive during each upshift of the rear box 2.

With the system thus generally described, the particular components will be described with greater specificity in each condition of operation.

*Operation of the Forward Transmission in Torque Converter Range (Fig. 3)*

Figure 3:
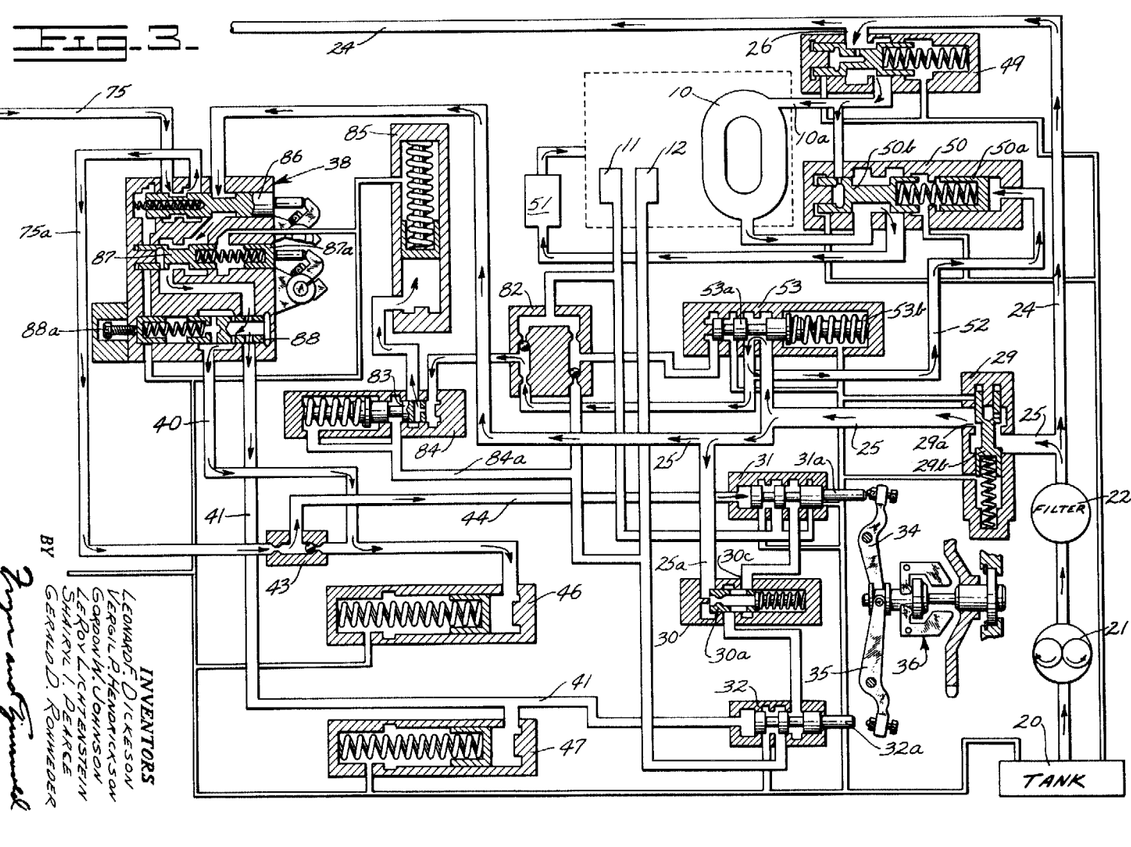
FIGS. 3, 4 and 5 are schematic illustrations of a portion of the hydraulic system showing in cross section the valves for controlling the forward transmission in different conditions of operation thereof.

Hydraulic fluid entering the control system of the first transmission through branch line 25 is reduced in pressure by flowing through a restricted orifice in the pressure reducing valve 29, the orifice restriction being imposed by a partial closing of outlet port 29a by operation of valve spool 29b. The fluid then continues along the intake branch line 25 to the shift valve branch line 25a and then to the flow control valve 30 leading to direct and overdrive shift valves 31 and 32. Both shift valves are at this stage closed since the governor control arms do not exert sufficient force to overcome the throttle influenced pressure in the lines 41 and 44.

While the direct drive clutch 11 and overdrive brake 12 are incative, the torque converter 10 is maintained under pressure by the torque converter charging valve 50 under force of pressure fluid acting on a piston 50a urging the valve spool 50b to close the drain to the lubricant cooler 51. The hydraulic fluid flows to the converter charging valve 50 because the control valve 53 is held open because no force is at this time acting on the valve spool 53a in opposition to the spring 53b.

Some of the fluid flowing from the converter valve 53 passes through a check valve 82 and through port in a piston 83 slidable in a valve body 84. Radial ports in the piston 83 permit the fluid to flow into and charge high pressure accumulator 85 while the piston seals off the dump passage 84a.

While the torque converter is thus fed and charged, the fluid flows through the front box intake branch line 25 to the throttle pressure regulator valve 38 which includes a normally open converter hold valve 86 connecting the over-ride pressure lines 75 and 75a, a throttle linkage controlled pressure reducing valve 87, and a differential valve 88 which divides the flow into shift valve pressure lines 40 and 41 maintaining a differential between the pressures in these lines. This differential determines the precise shift points between converter, direct drive and overdrive. These shift points can be adjusted by means of a cap screw 88a which, when tightened, tends to decrease the pressure in line 40, thus increasing the pressure differential permitting the various shifts to occur at a lower output speed.

Reducing valve 87 is operated by a load piston 87a biased by a finger 42 actuated by the throttle linkage so that as the throttle is depressed the spring load on valve 87 is increased to cause a corresponding increase in pressure within the lines 40 and 41.

*Operation of the Forward Transmission in Direct Drive (FIG. 4)*

Figure 4:
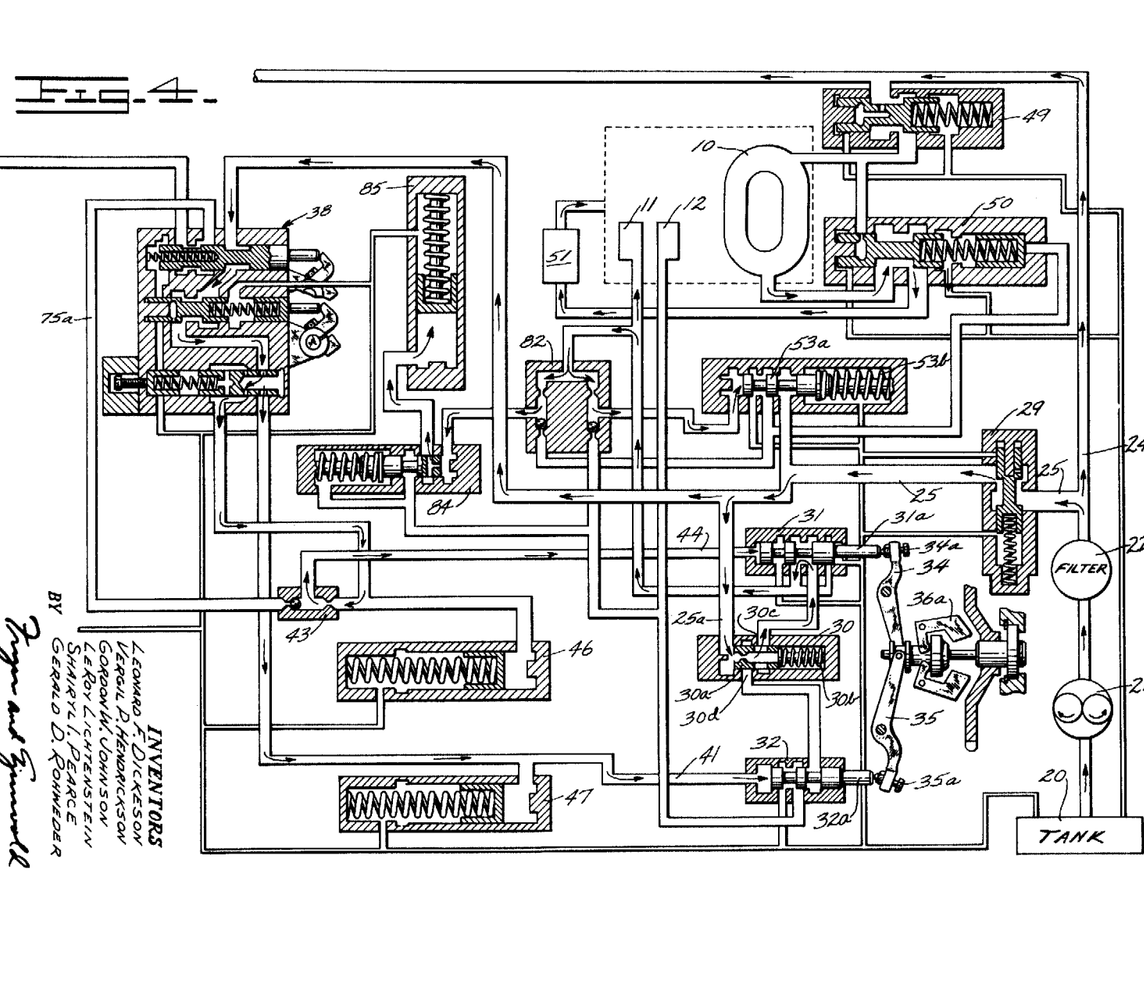

As the vehicle attains sufficient speed so that the fly weights 36a of governor 36 overcome the pressure in line 44, the spool 31a of the direct drive shift valve 31 is moved to the left. Shift valve 31 thus opens and stays open until the other governor arm 35 engages the spool 32a of the overdrive shift valve 32, fly weight force during this period being insufficient to overcome the combined pressures in both of the lines 41 and 44. Of course, the weights 36a and lever arm 34 are designed to achieve this movement during the desired speed range and a fine adjustment thereof is provided by screws 34a and 35a in the lever arms.

In any event, with the valve 31 open hydraulic fluid will now flow from branch line 25a, through the control valve 30 and through valve 31 to the direct drive clutch 11. It is to be noted that the piston 30a of the control valve 30 shifts somewhat to the right in opposition to the spring 30b because of the pressure differential caused by flow through the restricted orifice at the entrance end of the piston. The outlet port 30c is so situated that flow to the direct drive shift valve 31 is at a maximum because of this movement of the piston. As the direct drive clutch fills, hydraulic fluid is directed to the check valve 82 to flow therethrough in one direction to continue to charge the high pressure accumulator 85 and in the other direction to force the spool 53a of the converter control valve 53 against its spring 53b to cut off further flow of the hydraulic fluid to the converter charging valve 50 and opens the valve to a drain line. This reduces the pressure in hydraulic torque converter 10 to an extent that renders it inoperative. tI is to be noted that the converter charging valve 50 is not released until after the direct drive clutch 11 is fully pressurized and that, therefore, an overlap is provided from the torque converter drive to the direct operation, thus insuring that no torque drop will be experienced by the output.

*Operation of the Forward Transmission in Overdrive Range (FIG. 5)*

Figure 5:
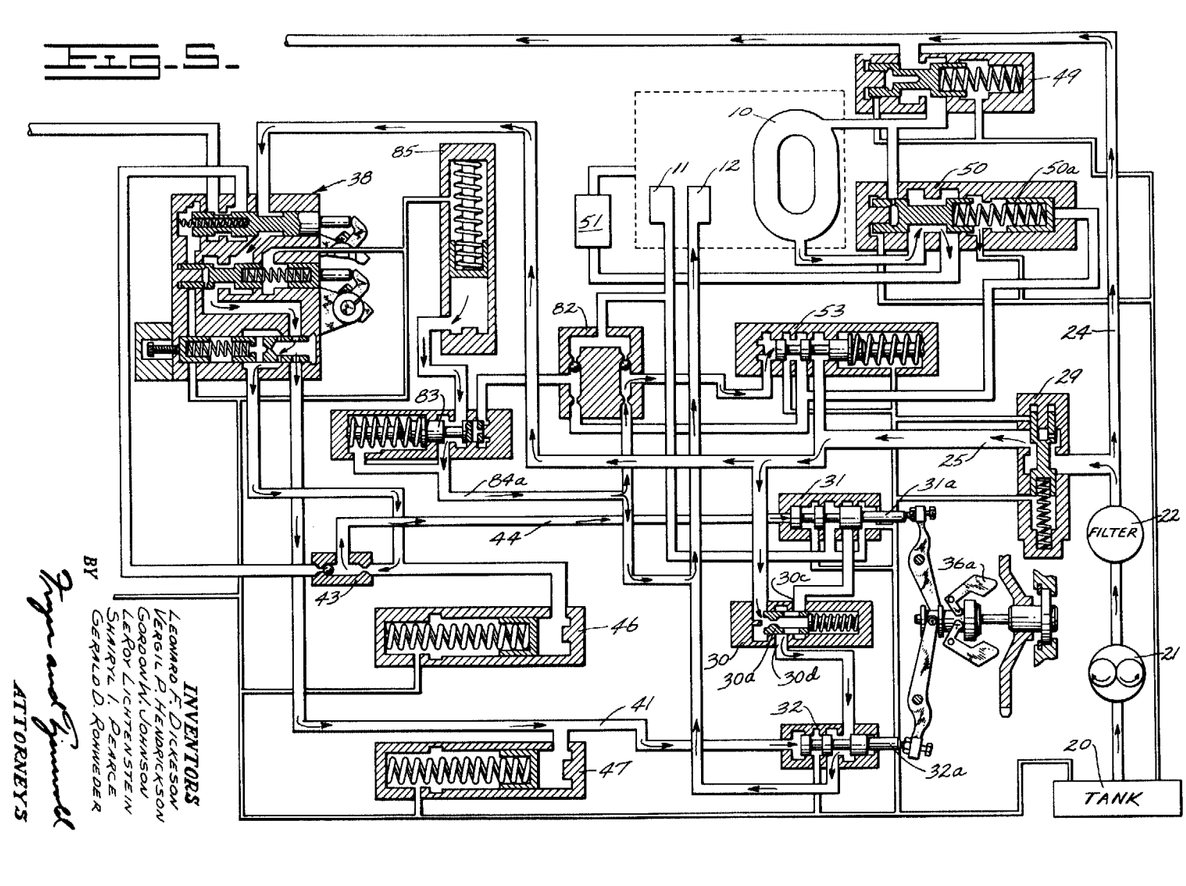

In the overdrive range the output has reached a speed so that the movement produced by the governor fly weights 36a is now sufficient to overcome the combined pressures in throttle pressure lines 41 and 44 so that the direct drive shift valve stem 31a is moved another increment to the left to again close off the conduit to the direct drive clutch 11, and the overdrive shift valve stem 32a is shifted to a position directing the flow of fluid from the control valve 30 to the overdrive transmission brake 12. It is to be noted that the port 30d in control valve 30 directing fluid to the shift valve 32 is offset from the direct drive outlet port 30c so that when the piston 30a is shifted to the right the port is restricted, thus limiting the flow to overdrive brake 12. In this way, the optimum flow for clutch 11 and brake 12 is obtained through a single valve. Since the direct drive clutch 11 is no longer under pressure the accumulator valve piston 83 is biased to the right to open the high pressure accumulator 85 to the dump line 84a and hence to the overdrive brake 12 to provide fast filling of the overdrive brake 12 and modulating the engagement thereof along with the fluid being directed through the overdrive shift valve 32. At the same time the pressure in the overdrive brake 12 is also directed through the check valve 82 to retain the converter control valve 53 in a position to drain the fluid behind the load piston 50a of converter charging valve 50 thus maintaining the converter 10 inoperable.

*Rear Transmission Operation, Neutral Position (FIGS. 6 And 3)*

Figure 6:
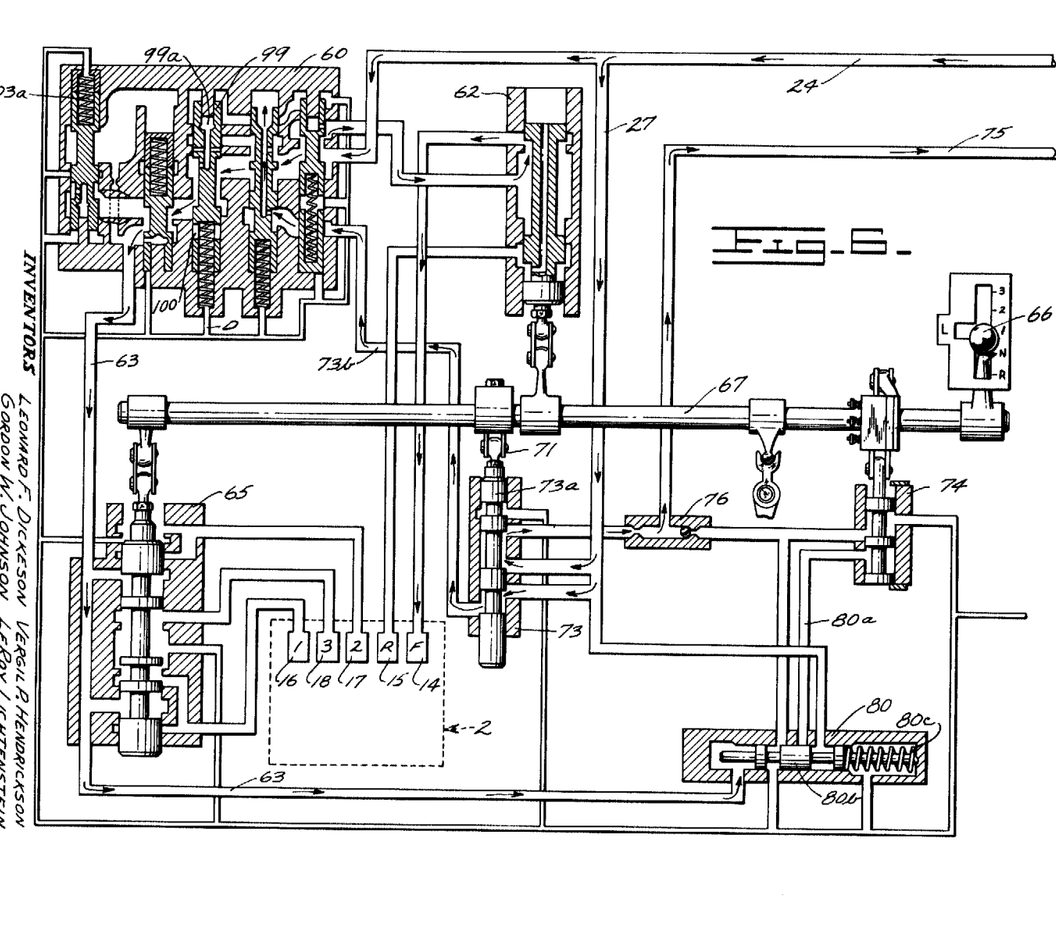

With the shift lever 66 in neutral position the shaft 67 is turned to actuate the linkage 71 to move the valve spool 73a of the torque converter hold valve 73 to an open position bringing the main line pressure branch line 27 into direct communication with the over-ride pressure line 75, through check valve 76. This over-riding pressure in line 75a forces the check valve 43 to the position shown in FIG. 3 and prevents the direct and overdrive shift valves 31 and 32 from operating, keeping the front transmission in torque converter drive.

*Operation of Rear Transmission on Upshift (FIGS. 7, 8 and 3)*

Figure 7:
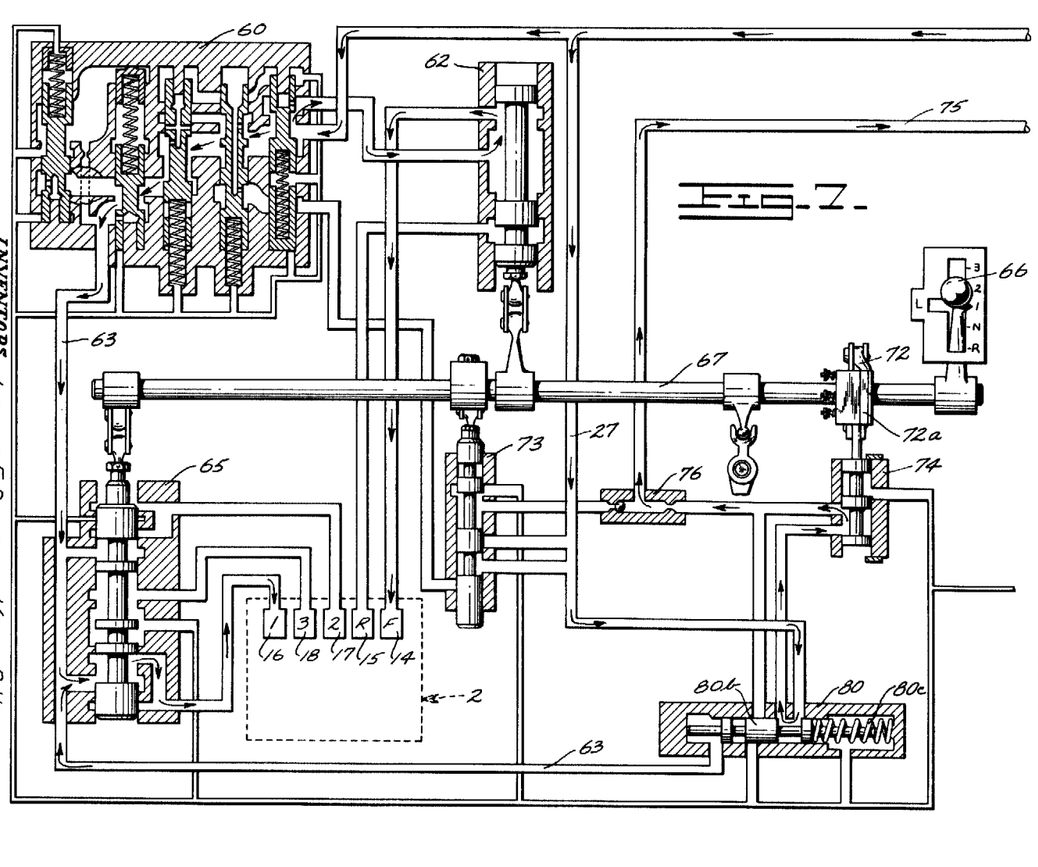

When shift lever 66 is moved to low gear position, or to any other speed for that matter, the rush of hydraulic fluid to fill the proper speed clutch 16, 17 or 18 reduces the pressure of the fluid in the line 63 acting against the spool 80b of the over-ride shut-off valve 80 permitting the spring 80c to open the valve and permit fluid to flow from the incoming branch line 27 to the now open over-ride selector valve 74 and then to over-ride pressure line 75 through check valve 76. With the increased pressure of line 75, 75a, the check valve 43 of the shift valve system assumes the position shown in FIG. 3 over-riding the throttle controlled pressure in line 40 and closing the direct drive shift valve 31 against the governor arm 34 to return the forward transmission 1 to torque converter drive. Then, as the appropriate speed clutch 16, 17 or 18 is filled the pressure in line 63 builds up as shown in FIG. 8 to close the over-ride shut-off valve 80. With the fluid of line 75, 75a no longer over-riding the governor controlled pressure in line 40, the load-speed balancing system associated with the shift valves 31, 32, is permitted to operate and control the forward transmission 1. Since the over-ride selector valve 74 is closed during downshifting, there can be no flow to the over-ride branch line 75a at that time, and hence no shifting into torque converter drive when shifting from a higher gear to a lower gear. Actually, a down shift will cause a temporary load drop which in turn causes a corresponding speed-up of the output automatically to place the front box in the desired overdrive range.

*Operation of Load Range Over-Ride System (FIG. 9)*

Figure 9:
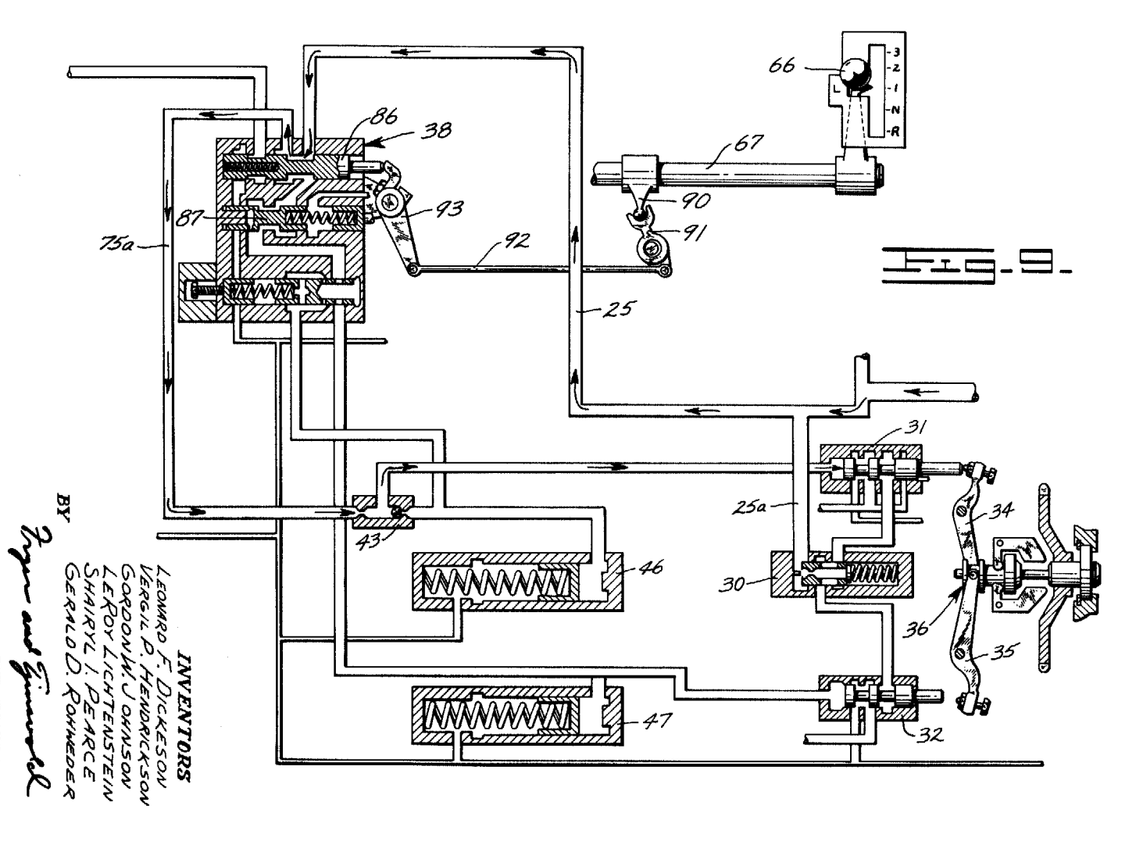
FIG. 9 shows a portion of the hydraulic system including means controlling the forward transmission for maximum torque delivery during operation of the rear transmission under load conditions.

The gear shift lever may be locked in low-speed or load range by axially shifting the lever and shaft 67. All spline connections controlling the valves 65, 73 and 74 permit the shaft 67 to slide therethrough. However, a finger 90, swivelled in an arm 91, moves with the shaft 67 to pivot the arm 91 and through suitable linkage 92 pivots an arm 93 to move the converter hold valve 86 to a position opening the outlet over-ride line 75a to the main forward transmission conduit 25, thus bypassing the pressure reducing valve control unit 38. Thus, with the shift lever in load position the rear transmission stays in low gear and the forward transmission stays in torque converter drive.

*Operation of the Rear Transmission Pressure Valve Control Unit (FIGS. 10, 11 and 6)*

The rear transmission pressure control valve unit 60 includes a pressure reducing valve 96 which controls the fluid in line 61 at a reduced pressure to the directional selecting valve 62 for actuation of the forward or reverse clutch (FIG. 6) after which fluid from line 28 is directed to a safety valve 98 and a preference or sequence valve 99 in the valve body 60. This insures that the directional clutches are always engaged before engagement of the selected speed clutch which is conditioned for absorption of the load. If the engine and vehicle are shut down with fluid pressure off, the valves 96, 98 and 99 assume the positions shown in FIG. 10 under action of their springs. Then, if the vehicle engine is started and the transmission control lever 66 is in any position other than neutral, the safety valve 98 prevents engagement of the speed selecting clutches by preventing the sequence valve 99 from opening to permit flow to the speed selector valve 65. The sequence valve 99 remains closed because the fluid in cavity 99a opposing the valve spring 99b is permitted to flow out through several radial passages 99c therein and then to a drain line D opened by the safety valve 98, faster than it flows in through only a single radial passage 99d. Since there is no opportunity for pressure buildup in the cavity 99a, the valve 99 remains closed. While flow to speed selector valve conduit 63 is thus prevented, line 63 and hence the speed clutches 16, 17 or 18 are drained through a plurality of radial ports 100 in sequence valve 99.

The safety valve 98 has two ports 98a and 98b providing access to flow of fluid into a cavity 98c wherein the fluid pressure opposes the spring 98d. Initially, before pressure build-up the safety valve 98 is in the position shown in FIG. 10 with the port 98a closed to flow of fluid from the main inlet duct 28 while port 98b is open to an auxiliary duct 73b coming from the safety reset and converter hold valve 73 (FIG. 6). The safety reset line 73b is opened only when the gear shift lever 66 is in neutral position and therefore, at that time, fluid can flow into the port 98b of the safety valve 98. This actuates the safety valve, moving it to the position shown in FIG. 11 to block the drain passage D through which fluid is evacuated from behind the preference or sequence valve 99. Once the safety valve 98 is thus actuated it stays open because then the port 98a is open to flow from branch line 28. With the drain D closed off pressure can now build up in the cavity 99a forcing the sequence valve 99 to open to the position shown in FIG. 6 permitting flow of fluid past a modulating pressure reducing valve 101 and into duct 63 to the speed clutches.

Figure 10:
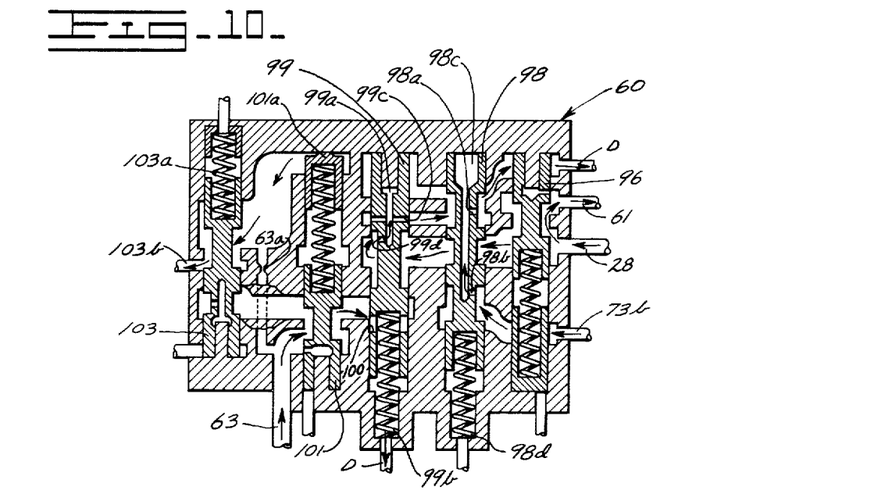
FIGS. 10 and 11 are more or les schematic cross section views of a pressure control valve unit forming part of the rear transmission control system.
Figure 11:
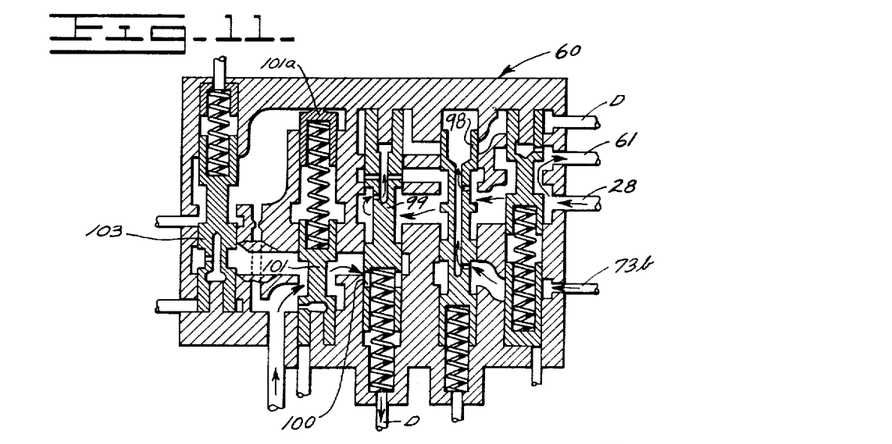

A check valve 103 also provided in the unit 60 operates under the reduced pressure during filling of the speed clutches during any shift so that it is overcome by its spring 103a to move from the position shown in FIG. 6 to that of FIGS. 10 and 7 opening a drain port 103b and dumping the fluid behind a load piston 101a associated with the modulating valve 101. Then, when the appropriate speed clutch 16, 17 or 18 is filled and pressure begins to rise in the manifold 63 the check valve 103 will close against its spring 103a allowing flow through an orifice 63a which will again build up pressure behind the load piston 101a, gradually to increase the spring load of the modulating valve 101. If orifice 63a were not provided the fluid behind load piston 101a would have to drain through ports 100 which would be much too slow. With orifice 63a fluid is required to be dumped quickly through drain 103b. This arrangement thereby insures

Adaptation of the Foregoing System To Deliver Nine Speeds in Reverse (FIGS. 1, 12, 13 and 14)

Figures 12, 13:
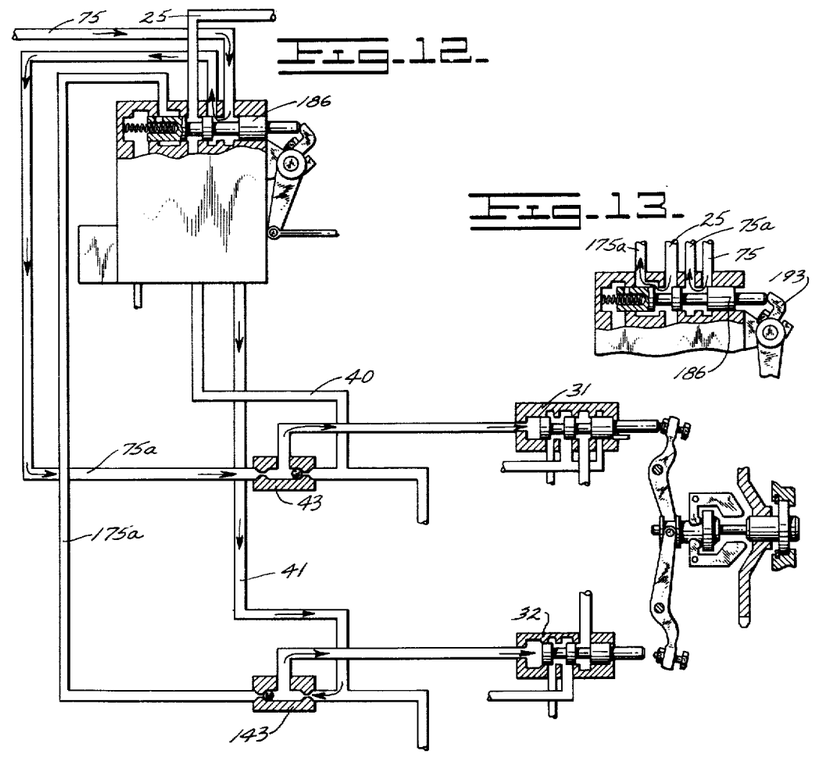
FIGS. 12, 13 and 14 are schematic illustrations of a modified control system.
Figure 14:
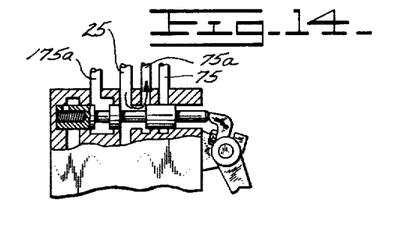

To adapt the above described system to a vehicle, such as a motor grader, which can utilize a plurality of reverse as well as forward speeds, few changes are necessary. In the rear transmission 2 a separate control lever is employed to actuate the forward and the reverse directional valve 62. This modification does not change the previously described operation but permits all three rear speed ranges along with the corresponding front box operation to be utilized in reverse. With a two lever control, radial ports 100 (FIG. 10) insure that clutches 16, 17 and 18 pick up the load when a directional change is made without a corresponding speed change. The only other change consists of redirecting the front box supply pressure to the overdrive shift valve 32 to prevent the front box from upshifting out of direct drive when loading or fine grading, thus achieving better control of the machine. This is accomplished by the valving shown in FIGS. 12, 13 and 14 wherein the two position spool 86 of the previous sketches is replaced by a three position spool 186 and an additional check valve 143 is connected to the line 41. In the position of FIG. 12 the operation is identical to that of FIG. 3 with the front box in converter range and the rear box in neutral or in upshift, supplying over-ride pressure to the front box through line 75, 75a. In FIG. 13 front transmission supply pressure from line 24 is directed to line 175a thus to deliver a hold pressure against the overdrive shift valve 32 and thereby prevent an upshift of the forward transmission 1 to overdrive. Spool 186 in this position retains communication between the over-ride pressure line 75 and line 75a so that the front box will be shifted to torque converter range during any upshift of the rear box. In FIG. 14 the third position of spool 186 is shown wherein it permits the front box supply pressure from line 25 to be directed to the direct drive shift valve control line 75a, 44 to hold the front box in converter range. In this spool position line 75 over-ride line is blocked.

Figure 15:
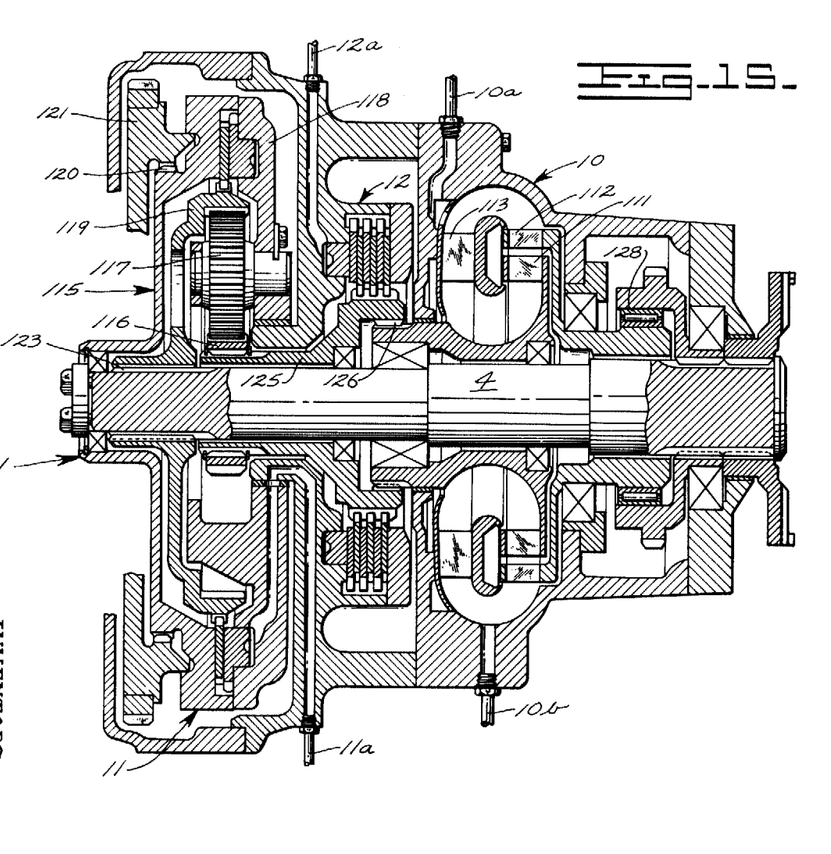
FIG. 15 is a view in cross section of a torque converter planetary gear, multiple clutch transmission forming a part of our invention.

Two Clutch Torque Converter Forward Transmission (FIG. 15)

In FIG. 15 is shown a three speed multi-clutch planetary gear and torque converter drive unit which is capable of maintaining a high degree of efficiency throughout its operating range. Specifically, the torque converter is operable only in its most efficient range, i.e. at low speeds and high torque, with the mechanical gear train transmitting all the torque as output speed increases. The forward transmission 1 includes a single stage torque converter 10 including a pump impeller 111, a turbine wheel 112 and a stationary reaction member 113. Pressure fluid is supplied to the torque converter 10 through inlet 10a and released through outlet duct 10b as previously described.

Also included within the housing 1 is a planetary gear train 115 comprising a sun gear 116, a plurality of planet gears 117 rotatably supported on a planet acrrier 118, and a ring gear 119. The carrier 118 is splined at 120 directly to an engine fly wheel 121 and the ring gear 119 is splined at 123 to the output shaft 4.

The sun gear 116 is mounted on a hollow intermediate shaft 125 splined at 126 to the pump impeller 111 of the hydraulic torque converter.

Interposed between the carrier 118 and the ring gear 119 is the direct drive clutch 11 which may comprise simply a pair of friction members normally separated but which may be urged together under pressure of hydraulic fluid entering in through conduit 11a. An overdrive brake 12 is interposed between the intermediate shaft 125, and hence sun gear 116 and the frame 1.

When the hydraulic torque converter is operative as previously described, the torque is split so that a portion, preferably about 75%, of the torque will be transmitted to he planetary set by way of ring gear 119 to the shaft 4 with the remainder being directed through the hydraulic torque converter. A one-way clutch, shown generally at 128 transmits the portion of the drive from the turbine 112 to the output shaft 4, the one-way clutch insuring that no torque absorbing drive is transmitted back through the torque converter 10 when the unit is operating in either direct or overdrive.

When the hydraulic torque converter is operable and clutch 11 and brake 12 are disengaged, the rotation of the carrier 118 will transmit torque to both the sun gear 116 and the ring gear 119, with sun gear 116 driving the impeller 111 to split the drive as above described. The ratio between the diameters of the sun gear 116 and ring gear 119, respectively, can be adjusted in design to achieve the desired lever ratio for apportionment of the torque transmission. For example, in FIG. 15 the diameter of the pitch circle of sun gear 116 is approximately one-third that of the pitch circle of the ring gear 119 so that three times as much torque or 75% of the total torque is transmitted through the planetary set to the shaft 21. Of course, in addition to size change the ratio could be altered by connecting the pump impeller 111 to some other element of the planetary train.

When the direct drive clutch 111 is actuated the fly wheel 121 is connected directly to the output shaft by way of the ring gear 119. The overdrive brake 12 is operative upon actuation to connect the sun gear 116 with the stationary housing 1 so that with the sun gear 116 stationary the planets 117 roll around to drive the ring gear 119, and hence the output shaft 4 and to increase speed over that of the fly wheel 121.

Since the hydraulic torque converter is rendered inoperable after engagement of the direct drive clutch 11 or overdrive brake 12 by draining through outlet duct 10b as previously described, there is no need for an additional clutch to actuate the torque converter unit, and the turbine 112 may be connected directly to the output shaft.

While the preferred embodiment of my transmission system and controls therefor have been described and illustrated it is obvious to those skilled in the art that modification may be made thereto. The scope of the invention, therefore, is not to be limited to the foregoing description but is to be determined by the appended claims.

Having described the invention we claim:

1. A drive train comprising:
   a variable speed transmission, and
   a hydraulic control system for said transmission
   said variable speed transmission including driving and driven shafts,
   a hydraulic torque converter operatively interposed between said shafts,
   hydraulic clutch means adapted to connect said shafts mechanically for direct drive therebetween, and
   hydraulic brake means adapted to induce a mechanical operable connection between said shafts for increased speed ratio drive,
   said hydraulic control system including:
   a source of pressure fluid,
   first and second shift valve means for bringing said source into communication with said clutch means and said brake means respectively,
   said valve means being movable in one direction from a torque converter range position wherein both of said valve means are closed successively to a direct drive position wherein said first valve means is opened while said second valve means remains closed and an overdrive position wherein said first valve means is closed and said second valve means is opened, and
   speed governor means on one of said shafts adapted to move said valve means in said one direction in response to speed increase.

2. The drive train defined in claim 1 including
a disabling valve operable to reduce fluid pressure in said torque converter thereby rendering it inoperative, and
means responsive to actuation of one of said brake and clutch means to operate said disabling valve.

3. The drive train defined in claim 1 including means adapted to be controlled by an engine throttle linkage to urge said first and second valve means in the opposite direction.

4. The drive train defined in claim 3 wherein said last named means includes a piston,
conduit means for directing said pressure fluid against said piston,
pressure control means interposed in said conduit for varying the pressure of fluid therein, and
motion transmitting means operating said pressure control means an amount proportionate to movement of the engine throttle linkage.

5. A drive train comprising:
a variable speed transmission including driving and driven shafts,
a hydraulic torque converter operatively interposed between said shafts,
first hydraulically operated means for connecting said shafts mechanically for direct drive therebetween, and
second hydraulically operated means for inducing a mechanical operable connection between said shafts for increased speed ratio drive, and
a hydraulic control system for said transmission including:
a source of pressure fluid normally in communication with said hydraulic torque converter,
shift valve means operative in open condition thereof to bring said source into communication with said first and said second hydraulically operated means respectively, and
speed governor means adapted to open said shift valve means to said first and said second hydraulically operated shift means successively in response to increases in speed of said driven shaft.

6. The drive train defined in claim 5 including a disabling valve operable to reduce fluid pressure in said torque converter rendering it inoperative, and
means responsive to operation of one of said first or said second hydraulically operated means to operate said disabling valve.

7. The drive train defined in claim 5 including means controlled by throttle linkage to urge said shift valve means toward a closed condition.

8. The drive train defined in claim 7 wherein said last named means includes a piston,
conduit means for directing said pressure fluid against said piston,
pressure control means interposed in said conduit for varying the pressure of fluid therein, and
a linkage movable with the engine throttle control for operating said pressure control means to increase the pressure of said pressure fluid with increased operation of said throttle.

9. The drive train defined in claim 8 including a second transmission having an input member and an output member connected in tandem with one of said driving and driven shafts of the variable speed transmission,
planetary gearing connecting said input and said output members, and
means for selectively shifting the path of power transmission through said planetary gearing to change the speed ratio delivered thereby.
a normally closed over-ride branch conduit in communication with said piston,
a source of pressure fluid sufficient to drive said piston and move said first and second valves to closed position, and
valve means operative to open said over-ride branch conduit when said shifting means is operated to shift said planetary gear transmission from a lower to a higher speed ratio.

10. In a drive train including a variable speed transmission driving and driven shafts,
a hydraulic torque converter operatively interposed between said shafts,
hydraulic clutch means adapted to connect said shafts mechanically for direct drive therebetween, and
hydraulic brake means adapted to induce a mechanical operable connection between said shafts for increased speed ratio drive,
the combination with said transmission of a hydraulic control system comprising:
a source of pressure fluid,
first and second shift valve means operative when opened to bring said clutch means and brake means respectively into communication with said source of pressure fluid, and
speed governor means adapted to open said first and said second shift valve means successively in response to increase in speed of said driven shaft.

11. In the combination defined in claim 10
a disabling valve operable to reduce fluid pressure in said torque converter thereby to render it inoperative, and
means responsive to a pressure build up in one of said brake and clutch means to operate said disabling valve.

12. In the combination defined in claim 10
a flow control valve adapted to direct unrestricted flow of pressure fluid to said first shift valve means and restricted flow of said pressure fluid to said second shift valve means.

13. In the combination defined in claim 10
a flow control valve adapted to direct said pressure fluid to said first and second shift valve means, comprising:
a valve body having a cylindrical bore therein,
a piston slidable in said valve body,
first and second outlets in said cylinder in communication with said first and second shift valve means respectively,
first and second ports in said piston in radial alignment with said first and second outlets respectively,
a restricted orifice at one end of said piston to admit pressure fluid into said piston for outward flow through said ports and outlets, and
a resilient member urging said piston toward said one end in opposition to pressure differential resulting from flow through said orifice,
said first port being normally partially open to said first outlet and being movable toward alignment therewith under force of said pressure differential,
said second port being normally open to said second outlet but being movable out of alignment therewith under build up of said pressure differential.

14. In the combination defined in claim 10,
a pair of pistons,
each of said pistons being operative when actuated to urge one of said first and second valve means toward closed position,
a source of pressure fluid in communication with said pistons, and
means operated in response to operation of the engine throttle for varying the pressure of said fluid proportionate to said throttle operation.

15. A drive train comprising:
a variable speed transmission including driving and driven shafts, a hydraulic torque converter having an impeller and a turbine,
said impeller being mounted on said driving shaft to rotate therewith,
a one-way clutch connecting said turbine to said driven shaft,
a mechanical drive train interposed between said driving and said driven shafts,
hydraulic clutch means for activating said mechanical drive train, and
a hydraulic control system for said transmission including:
a source of pressure fluid normally in communication with said torque converter,
shift valve means operative when opened to bring said hydraulic clutch means into communication with said source,
a disabling valve operative when actuated to release pressure fluid from said torque converter thereby to disable said torque converter, and
means operative in response to operation of said clutch means for actuating said disabling valve.

16. A variable speed transmission comprising:
driving and driven shafts,
a hydraulic torque converter including an impeller, a turbine and a motion transmitting pressure fluid,
said impeller being mounted on said driving shaft to rotate therewith,
said turbine being connected to said driven shaft by a one-way clutch,
a mechanical drive train interposed between said driving and driven shafts,
clutch means for activating said mechanical drive train, and
a disabling valve in communication with said torque converter operative when actuated to reduce the pressure of said fluid thereby to disable said torque converter, and
means operative in response to operation of said clutch means for actuating said disabling valve.

17. A drive train comprising:
a variable speed transmission,
a planetary gear transmission connected in tandem therewith, and
a hydraulic control system for said variable speed and planetary gear transmissions,
said variable speed transmission including driving and driven shafts,
a hydraulic torque converter operatively interposed between said shafts,
a mechanical drive operatively interposed between said shafts, and
hydraulic clutch means operative when engaged to actuate said mechanical drive,
said planetary gear transmisison having an input member and an output member,
a plurality of power paths through said planetary gear transmission each for delivering a predetermined ratio, and
pressure fluid operated means for activating each of said power paths,
said hydraulic control system including a source of pressure fluid in communication with said torque converter,
shift valve means operative when open to bring said source into communication with said hydraulic clutch means
a disabling valve operative in response to operation of said hydraulic clutch means to release pressure fluid from and disable said torque converter,
a speed selector valve selectively shiftable into a plurality of speed range positions thereby to activate one of said lower paths and a neutral position to bypass said power path activating means,
and safety valve means preventing flow of pressure fluid to said pressure fluid operated means for activating each of said power paths until after said shift selector valve has been shifted to said neutral position.

18. A drive train comprising:
a variable speed transmission,
a planetary gear transmission connected in tandem therewith, and
a hydraulic control system for said variable speed and planetary gear transmissions,
said variable speed transmission including driving and driven shafts,
a hydraulic torque converter operatively interposed between said shafts forming an independent power path therebetween,
a mechanical drive operatively interposed between said shafts forming a power path between said shafts which is independent of said torque converter, and
hydraulic clutch means operative when engaged to actuate said mechanical drive,
said planetary gear transmission including input and output members,
a plurality of power paths through said planeary gear transmission,
pressure fluid operated means for activating selectively each of said power paths,
said hydraulic control system including a source of pressure fluid,
shift valve means operative to bring said hydraulic clutch means into communication with said source, and
speed governor means adapted to operate said shift valve means; and
manually operable valve means for bringing said source into communication with said pressure fluid operated means.

19. A drive train comprising:
a variable speed transmission,
a planetary gear transmission connected in tandem therewith, and
a hydraulic control system for said variable speed and planetary gear transmissions,
said variable speed transmission including driving and driven shafts,
a hydraulic torque converter operatively interposed between said shafts forming an independent power path therebetween,
a mechanical drive operatively interposed between said shafts forming a power path between said shafts which is independent of said torque converter, and
hydraulic clutch means operative when engaged to actuate said mechanical drive,
said planetary gear transmission including input and output members,
a plurality of power paths through said planetary gear transmission,
means for activating selectively each of said power paths,
said hydraulic control system including a source of pressure fluid,
shift valve means operative to bring said hydraulic clutch means into communication with said source,
speed governor means adapted to operate said shift valve means.

20. A variable speed transmission comprising:
driving and driven shafts,
a hydraulic torque converter including an impeller, a turbine and a motion transmitting pressure fluid,
said impeller being mounted on said driving shaft to rotate therewith,
said turbine being connected to said driven shaft,
a mechanical drive train interposed between said driving and driven shafts,
means for activating said mechanical drive train, and a disabling valve in communication with said torque converter operative when connected to reduce the pressure of said fluid thereby to disable said torque converter, and means operative in response to operation of said first named means for actuating said disabling valve.

References Cited in the file of this patent

UNITED STATES PATENTS

| | | |
|---|---|---|
| 2,302,714 | Pollard | Nov. 29, 1942 |
| 2,608,880 | Flinn | Sept. 2, 1952 |
| 2,755,688 | Swennes | July 24, 1956 |
| 2,859,762 | Banker | Nov. 11, 1958 |
| 2,910,085 | Banker | Oct. 27, 1959 |
| 2,926,543 | Holdeman et al. | Mar. 1, 1960 |
| 2,965,202 | Christenson et al. | Dec. 20, 1960 |
| 2,978,928 | Tuck et al. | Apr. 11, 1961 |
| 3,053,116 | Christenson et al. | Sept. 11, 1962 |

FOREIGN PATENTS

| | | |
|---|---|---|
| 589,095 | Great Britain | June 11, 1947 |

UNITED STATES PATENT OFFICE
CERTIFICATE OF CORRECTION

Patent No. 3,096,667                                                         July 9, 1963

Leonard F. Dickeson et al.

It is hereby certified that error appears in the above numbered patent requiring correction and that the said Letters Patent should read as corrected below.

Column 1, line 22, for "transissions" read -- transmissions --; line 48, for "les" read -- less --; column 2, line 1, strike out "a"; line 47, for "flow" read -- flows --; column 3, line 68, for "incative" read -- inactive --; column 4, line 60, for "tI" read -- It --; column 7, line 62, for "acrrier" read -- carrier --; column 8, line 4, for "he" read -- the --; column 10, lines 7 and 8, after "transmission" insert -- having --; column 11, lines 58 and 59, after "predetermined" insert -- speed --; line 74, for "lower" read -- power --.

Signed and sealed this 21st day of January 1964.

(SEAL)
Attest:
ERNEST W. SWIDER

EDWIN L. REYNOLDS

Attesting Officer                                           Acting Commissioner of Patents